US012759292B2

(12) United States Patent
Lum et al.

(10) Patent No.: US 12,759,292 B2
(45) Date of Patent: Oct. 13, 2026

(54) FLUID-EJECTION PRINTHEAD HAVING SPARSE ARRAY OF FLUID-EJECTION NOZZLES

(71) Applicant: Hewlett-Packard Development Company, L.P., Spring, TX (US)

(72) Inventors: Jacob Lum, Corvallis, OR (US); James R. Przybyla, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 183 days.

(21) Appl. No.: 18/720,579

(22) PCT Filed: Dec. 20, 2021

(86) PCT No.: PCT/US2021/064269
§ 371 (c)(1),
(2) Date: Jun. 14, 2024

(87) PCT Pub. No.: WO2023/121638
PCT Pub. Date: Jun. 29, 2023

(65) Prior Publication Data
US 2025/0058563 A1 Feb. 20, 2025

(51) Int. Cl.
*B41J 2/14* (2006.01)
*B41J 2/15* (2006.01)
*B41J 2/155* (2006.01)

(52) U.S. Cl.
CPC ............ *B41J 2/14145* (2013.01); *B41J 2/15* (2013.01); *B41J 2/155* (2013.01); *B41J 2002/14459* (2013.01); *B41J 2002/14475* (2013.01); *B41J 2202/11* (2013.01); *B41J 2202/12* (2013.01)

(58) Field of Classification Search
CPC .... B41J 2/155; B41J 2202/11; B41J 2202/20; B41J 2002/14475; B41J 2002/14459; B41J 2/14145; B41J 2/15
See application file for complete search history.

(56) References Cited

U.S. PATENT DOCUMENTS

| | | | | |
|---|---|---|---|---|
| 6,099,108 | A | 8/2000 | Weber et al. | |
| 6,447,097 | B1 * | 9/2002 | Folkins .................... | B41J 2/145 347/12 |
| 7,364,278 | B2 | 4/2008 | Kachi et al. | |
| 8,757,783 | B2 | 6/2014 | Govyadinov et al. | |
| 9,168,737 | B1 | 10/2015 | Oi | |

(Continued)

FOREIGN PATENT DOCUMENTS

| | | | |
|---|---|---|---|
| EP | 2373590 | B1 | 8/2013 |
| EP | 2563597 | B1 | 4/2020 |
| WO | 2021/201824 | A1 | 10/2021 |

*Primary Examiner* — Henok D Legesse
(74) *Attorney, Agent, or Firm* — Foley & Lardner LLP

(57) ABSTRACT

A fluid-ejection printhead includes a sparse array of fluid-ejection nozzles through which fluid is ejected onto dot rows parallel to a scan axis of the fluid ejection printhead. The fluid is ejected by more than one fluid-ejection nozzle of the sparse array onto each dot row. The fluid-ejection printhead includes fluid ejection element. Each element can correspond to a pair of the fluid-ejection nozzles through which the fluid is ejected onto a same dot row and include a corresponding pair of fluid-ejection actuators. Each element can instead correspond to one of the fluid-ejection nozzles and include one fluid-ejection actuator.

14 Claims, 11 Drawing Sheets

(56) References Cited

U.S. PATENT DOCUMENTS

| | | | |
|---|---|---|---|
| 2011/0279544 | A1 | 11/2011 | Dovrat et al. |
| 2013/0033551 | A1 | 2/2013 | Karlinski |
| 2017/0341377 | A1 | 11/2017 | Sakurai et al. |
| 2019/0001698 | A1 | 1/2019 | Yamazaki et al. |
| 2020/0079081 | A1 | 3/2020 | Mizuno |

* cited by examiner 100
401
601
406A
406B
406C
406D
304A
304B
304C
304D
502A
502B
502C
502D
504A
504B
504C
504D
602A
602B
604A
604B
604C
604D
606A
606B
606C
606D

FLUID-EJECTION PRINTHEAD HAVING SPARSE ARRAY OF FLUID-EJECTION NOZZLES

CROSS-REFERENCE TO RELATED APPLICATIONS

This application is a US National Stage Entry under 35 U.S.C. § 371 of International Application No.: PCT/US2021/064269 filed Dec. 20, 2021, which is hereby incorporated by reference in its entirety.

BACKGROUND

Printing devices can output print material onto a substrate to form images on the substrate. Some printing devices eject fluid, such as ink, onto a substrate, such as paper, to form the images, and are more generally referred to as fluid-ejection devices. Such fluid-ejection devices, which can include inkjet-printing devices, may operate in one of two ways.

First, a fluid-ejection device may have a scanning carriage on which one or multiple fluid-ejection printheads are disposed. A print substrate is advanced under the carriage and then remains stationary as the carriage scans back and forth over a current swath of the substrate for the printheads to eject fluid onto the swath. The substrate is then advanced to the next swath onto which fluid is to be ejected.

Second, a fluid-ejection device may employ a print bar on which a pagewide array (PWA) of fluid-ejection printheads is disposed. Such a PWA of printheads can simultaneously eject fluid onto entire swaths of a print substrate as the substrate advances under the print bar. The print bar therefore does not have to scan back and forth over a current swath of the substrate, and printing occurs more quickly.

DETAILED DESCRIPTION

As noted in the background, a printing device can be a fluid-ejection device, and may include fluid-ejection printheads that eject fluid onto a substrate. A fluid-ejection printhead may have fluid-ejection elements including fluid-ejection actuators, such as thermal resistors in the case of a thermal fluid-ejection device. Firing a thermal resistor causes ejection of a fluid drop through a corresponding fluid-ejection nozzle.

The fluid-ejection nozzles for the fluid-ejection elements can be organized in a column parallel to a print axis and orthogonal to a scan axis of the printhead. Each nozzle corresponds to a different dot, or pixel, row. A dot row is a row of dots that the printhead can print along the scan axis. The fluid-ejection nozzles for the fluid-ejection elements can instead be organized in a sparse array in which the nozzles corresponding to different, adjacent dot rows are spaced apart along the scan axis.

A fluid-ejection printhead can be susceptible to certain issues that give rise to corresponding image quality defects. For instance, if the fluid-ejection actuator of a fluid-ejection element fails, fluid for the corresponding dot row will not be able to be ejected through its corresponding fluid-ejection nozzle. This issue can result in bands of a printed image, parallel to the scan axis, where fluid is not printed.

Fluid-ejection printheads having sparse arrays of fluid-ejection nozzles for fluid-ejection elements are described herein that ameliorate these issues. For each dot row, there can be more than one fluid-ejection actuator and thus more than one corresponding fluid-ejection nozzle, on the same or different fluid-ejection element. Therefore, if one fluid-ejection actuator fails, fluid can still be ejected on the corresponding dot row. The fluid-ejection actuators for a dot row may also eject fluid through their respective fluid-ejection nozzles at different drop weights, increasing the fluid density range that can be achieved for the dot row.

Figure 1A:
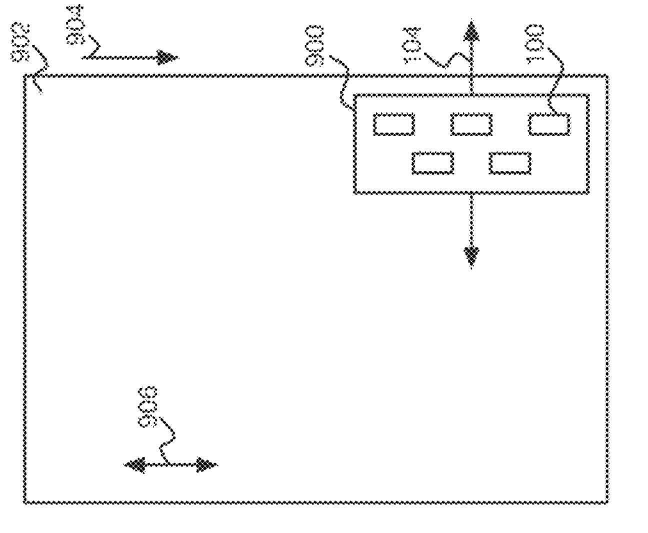
FIGS. 1A and 1B are diagrams of an example scanning carriage having multiple fluid-ejection printheads and an example print bar having a pagewide array (PWA) of multiple fluid-ejection printheads, respectively.
Figure 1B:
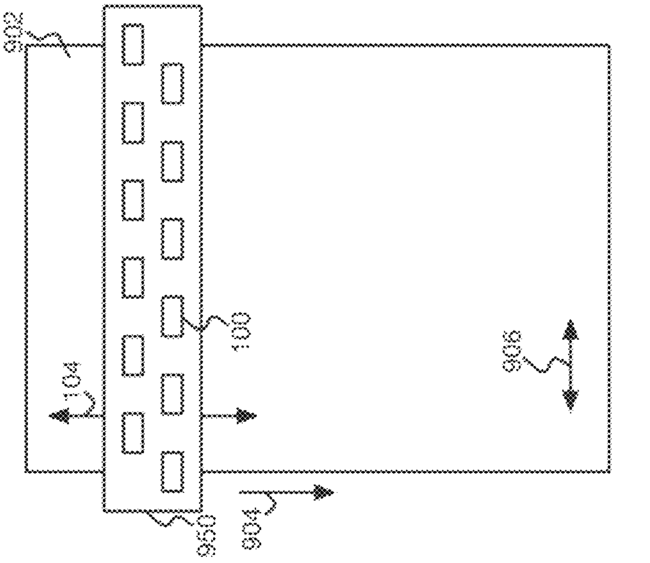

FIGS. 1A and 1B are diagrams of an example scanning carriage 900 having multiple fluid-ejection printheads 100 and an example print bar 950 having a pagewide array (PWA) of multiple fluid-ejection printheads 100, respectively. In both FIGS. 1A and 1B, a scan axis 104 of the fluid-ejection printheads 100 and an orthogonal print axis 906 are identified. A print substrate 902, such as a print medium like paper, advances along the direction 904, which is parallel to the print axis 906 in FIG. 1A and perpendicular to the print axis 906 in FIG. 1B.

In FIG. 1A, the scanning carriage 900 is scanned parallel to the scan axis 104 while the print substrate 902 remains stationary. A current swath of the substrate 902 is the portion of the substrate 902 under the fluid-ejection printheads 100, from the topmost printhead 100 to the bottommost printhead 100. While the carriage 900 is scanning in either or both directions parallel to the scan axis 104, the printheads 100 selectively eject fluid onto the current swath. The print substrate 902 is then advanced along the direction 904, by a swath or less, and the carriage 900 is again scanned for selective fluid ejection by the printheads 100 while the substrate 902 remains stationary.

In FIG. 1B, the print substrate 902 is continually advanced along the direction 904. As the substrate 902 is so advanced, the fluid-ejection printheads 100 of the print bar 950 selectively eject fluid onto the substrate 902. The print bar 950 remains stationary while printheads 100 selectively eject fluid and while the substrate 902 is advancing. The print bar 950 may indeed be fixed, and unable to move at all.

Figure 2:
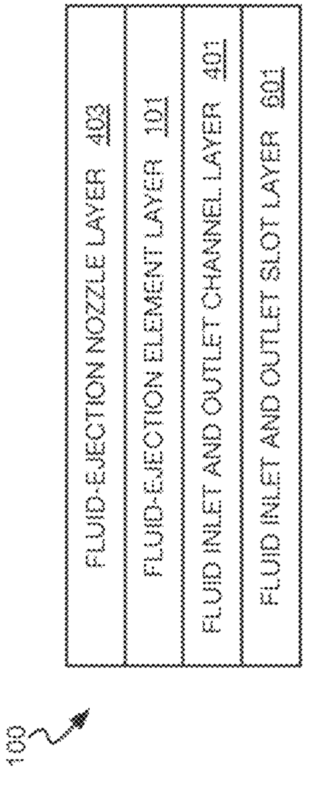
FIG. 2 is a cross-sectional diagram of the constituent layers of an example fluid-ejection printhead that can be used in the scanning carriage and the print bar of FIGS. 1A and 1B.

FIG. 2 shows a cross-section of one such example fluid-ejection printhead 100 of the scanning carriage 900 of FIG. 1A or the print bar 950 of FIG. 1B. The printhead 100 includes layers 101, 401, 403, and 601, which are described generally in relation to FIG. 2 and in detail in relation to subsequent figures. The layer 101 is a fluid-ejection element layer 101 that includes the fluid-ejection actuators of fluid-ejection elements. The layer 403 is a fluid-ejection nozzle layer 403 that includes fluid-ejection nozzles for the fluid-ejection elements. When an actuator is fired, fluid is ejected through and from a corresponding nozzle.

The layer 401 is a fluid inlet and outlet channel layer 401 including fluid inlet channels that supply fluid to the fluid-ejection elements, for ejection by the fluid-ejection actuators and in some implementations for recirculation through the elements. The layer 401 also includes fluid outlet channels that receive fluid from the fluid-ejection elements that is not ejected by the actuators. The layer 601 is a fluid inlet and outlet slot layer 601 including one or multiple fluid inlet slots that supply fluid to the fluid inlet channels. The layer 601 also includes one or multiple fluid outlet slots that receive fluid from the fluid outlet channels.

Figure 3:
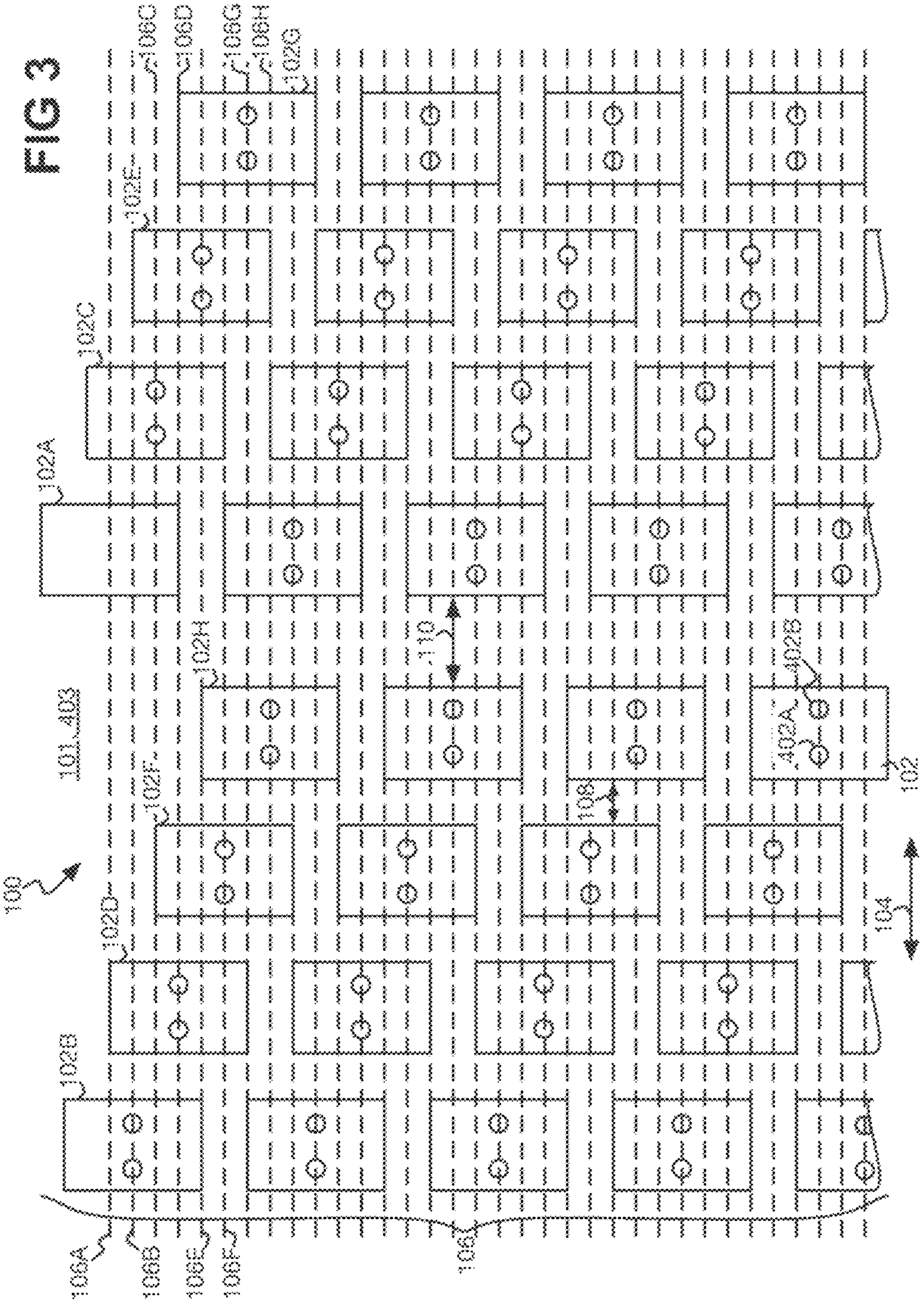
FIG. 3 is a top-view diagram of an example fluid-ejection element layer and an example fluid-ejection nozzle layer of the fluid-ejection printhead of FIG. 2.

FIG. 3 shows a top view of an example fluid-ejection element layer 101 and an example fluid-ejection nozzle layer 403 of the fluid-ejection printhead 100. The fluid-ejection element layer 101, which is under the fluid-ejection nozzle layer 403, includes fluid-ejection elements 102. In the example, the fluid-ejection nozzle layer 403 includes a pair of fluid-ejection nozzles 402A and 402B for each fluid-ejection element 102. In other implementations, however, there may be as few as one nozzle 402A for each element 102, or more than two nozzles 402A and 402B for each element 102. The nozzles 402A and 402B are depicted as larger than in actuality for illustrative clarity, and further are depicted as being the same size for illustrative convenience, but may be of different sizes.

Fluid is ejected through and from the fluid-ejection nozzles 402A and 402B for the fluid-ejection elements 102 on respective dot rows 106 parallel to the scan axis 104 of the printhead 100. Specifically, the nozzles 402A and 402B intersecting a given dot row 106 correspond to that dot row 106, such that fluid is ejected onto a given dot row 106 from and through the nozzles 402A and 402B intersecting that dot row 106. Stated another way, each dot row 106 symmetrically bisects one fluid-ejection element 102, and the element 102 that is symmetrically bisected by a given dot row 106 ejects fluid onto that dot row 106 through the nozzles 402A and 402B for that element 102.

The fluid-ejection nozzles 402A and 402B for the fluid-ejection elements 102 are organized in a sparse array in that the nozzles 402A and 402B for different elements 102 are spaced apart over (i.e., are at corresponding locations along a direction parallel to) the scan axis 104 of the printhead 100. That is, the nozzles 402A and 402B through and from which corresponding elements 102 eject fluid onto different, adjacent dot rows 106 are not columnarly organized orthogonal to the scan axis 104 one over another. The fluid-ejection elements 102 for the nozzles 402A and 402B through and from which fluid is ejected onto different, adjacent dot rows 106 are likewise not columnarly organized orthogonal to the scan axis 104 one over another.

For example, the fluid-ejection elements 102A, 102B, 102C, 102D, 102E, 102F, 102G, and 102H respectively eject fluid through respective pairs of fluid-ejection nozzles 402A and 402B onto the first eight dot rows 106A, 106B, 106C, 106D, 106E, 106F, 106G, and 106H. The element 102B for the dot row 106B and its nozzles 402A and 402B are spaced along the scan axis 104 relative to the element 102A and its nozzles 402A and 402B for the adjacent dot row 106A. That is, the nozzles 402A and 402B for the element 102B are not positioned directly under the nozzles 402A and 402B perpendicular to the scan axis 104 as in a non-sparse fluid-ejection element nozzle array. Similarly, the element 102C and its nozzles 402A and 402B for the dot row 106C are spaced along the scan axis 104 relative to the element 102B and its nozzles 402A and 402B for the adjacent dot row 106B, and so on.

In the example, adjacent fluid-ejection elements 102 along the scan axis 104 are separated by a distance 108, except for the middle two elements 102, which are separated by a distance 110 that is greater than the distance 108. The distance 110 may be greater than the distance 108 to provide space for temperature sensors and/or other circuitry on the printhead 100.

In the example, the fluid-ejection elements 102A, 102C, 102E, 102G, et seq., and their fluid-ejection nozzles 402A and 402B responsible for the odd dot rows 106A, 106C, 106E, 106G, et seq., are on the right, whereas the elements 102B, 102D, 102F, and 102H, et seq., and their nozzles 402A and 402B responsible for the even dot rows 106B, 106D, 106F, 106H, et seq., are on the left. However, in another implementation, the elements 102 and their nozzles 402A and 402B responsible for the odd dot rows 106 may be on the left and the elements 102 and their nozzles 402A and 402B responsible for the even dot rows 106 may be on the right. In this case, the elements 102 and the nozzles 402A and 402B on the left would be shifted upwards by one dot row 106, and the elements 102 and the nozzles 402A and 402B on the right would be shifted downwards by one dot row 106.

Figure 4B:
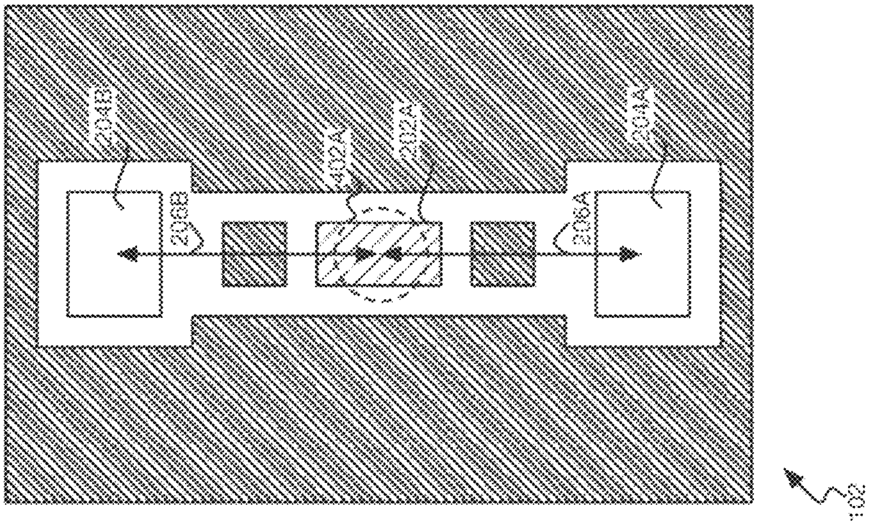
FIGS. 4A and 4B are diagrams of different example fluid-ejection elements that can be used in the fluid-ejection printhead of FIG. 2.
Figure 4A:
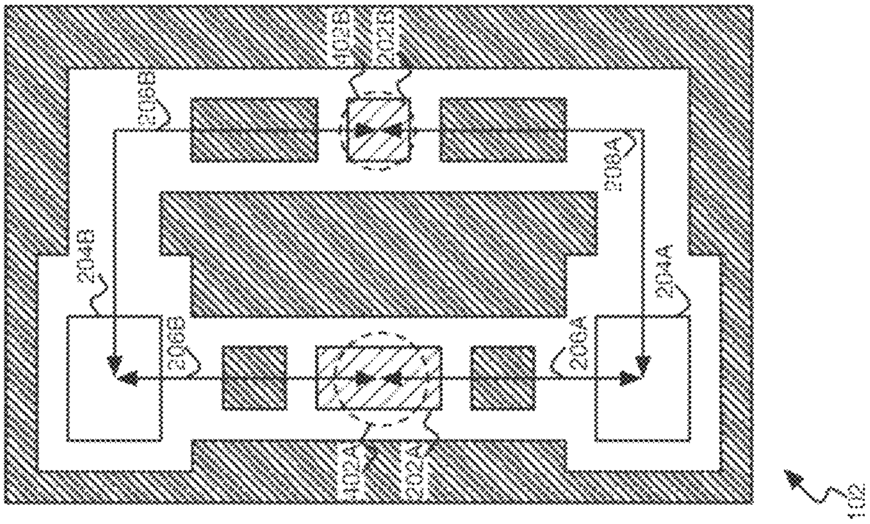

FIGS. 4A and 4B show different example fluid-ejection elements 102. Each fluid-ejection element 102 in FIG. 3 is specifically implemented as the fluid-ejection element 102 of FIG. 4A, but can instead be implemented as the fluid-ejection element 102 of FIG. 4B. The element 102 of FIG. 4A includes a pair of (first and second) fluid-ejection actuators 202A and 202B, which can be individually fired to eject fluid through fluid-ejection nozzles 402A and 402B, respectively. By comparison, the element 102 of FIG. 4B includes one actuator 202A that is fired to eject fluid through a fluid-ejection nozzle 402A. The fluid-ejection actuators 202A and 202B can be thermal firing resistors, for instance. In another implementation, there may be more than two fluid-ejection actuators 202A and 202B.

Because the fluid-ejection element 102 is responsible for ejecting fluid onto a corresponding dot row 106, this means that in FIG. 4A there are two fluid-ejection actuators 202A and 202B for this dot row 106. If either actuator 202A or 202B fails, the other actuator 202B or 202A can still eject fluid on the dot row 106, resulting in an improvement in image quality as compared to if no fluid could be ejected on the dot row 106. The actuators 202A and 202B can further output fluid at different drop weights. In the example, the actuator 202A is larger than the actuator 202B, and thus has a greater drop weight than the actuator 202B. The fluid-ejection nozzle 402A through which the actuator 202A ejects fluid may also or instead be larger than the fluid-ejection nozzle 402B through which the actuator 202B ejects fluid to achieve a greater drop weight.

In both FIGS. 4A and 4B, the fluid-ejection element 102 includes a fluid inlet feedhole 204A and a fluid outlet feedhole 204B. In FIG. 4A, both fluid-ejection actuators 202A and 202B share the same pair of feedholes 204A and 204B. Stated another way, in each of FIGS. 4A and 4B, there is one pair of feedholes 204A and 204B. The inlet feedhole 204A is depicted below the outlet feedhole 204B in the example, but can instead be above the feedhole 204B. Fluid can recirculate the fluid-ejection element 102, even when the element 102 is not actuating fluid. Specifically, fluid can enter the fluid-ejection element 102 at the inlet feedhole 204A, flow past the fluid-ejection actuator 202A (and also the actuator 202B in FIG. 4A), and exit the element 102 at the outlet feedhole 204B.

Furthermore, each fluid-ejector actuator 202A and 202B is symmetrically positioned between the feedholes 204A and 204B. Specifically, the distance 206A, or shelf length, between the actuator 202A and the feedhole 204A is equal (i.e., identical) to the distance 206B, or shelf length, between the actuator 202A and the feedhole 204B. In FIG. 4A, the distance 208A, or shelf length, between the actuator 202B and the feedhole 204B is also equal (i.e., identical) to the distance 208B, or shelf length, between the actuator 202B and the feedhole 204B. However, the (first) distances 208A and 208B are longer than the (second) distances 206A and 206B in FIG. 4A, since the feedholes 204A and 204B are not centered from left to right.

The symmetrical positioning of each fluid-ejection actuator 202A and 202B between the feedholes 204A and 204B provides for more random distribution of cavitation along the entire surfaces of the actuators 202A and 202B during firing. Therefore, image quality degradation over time as a result of regular and concentrated cavitation of the surfaces of the actuators 202A and 202B can be avoided, and actuator lifetime can be improved. The actuators 202A and 202B can also be independently fired, as noted above.

Figure 5:
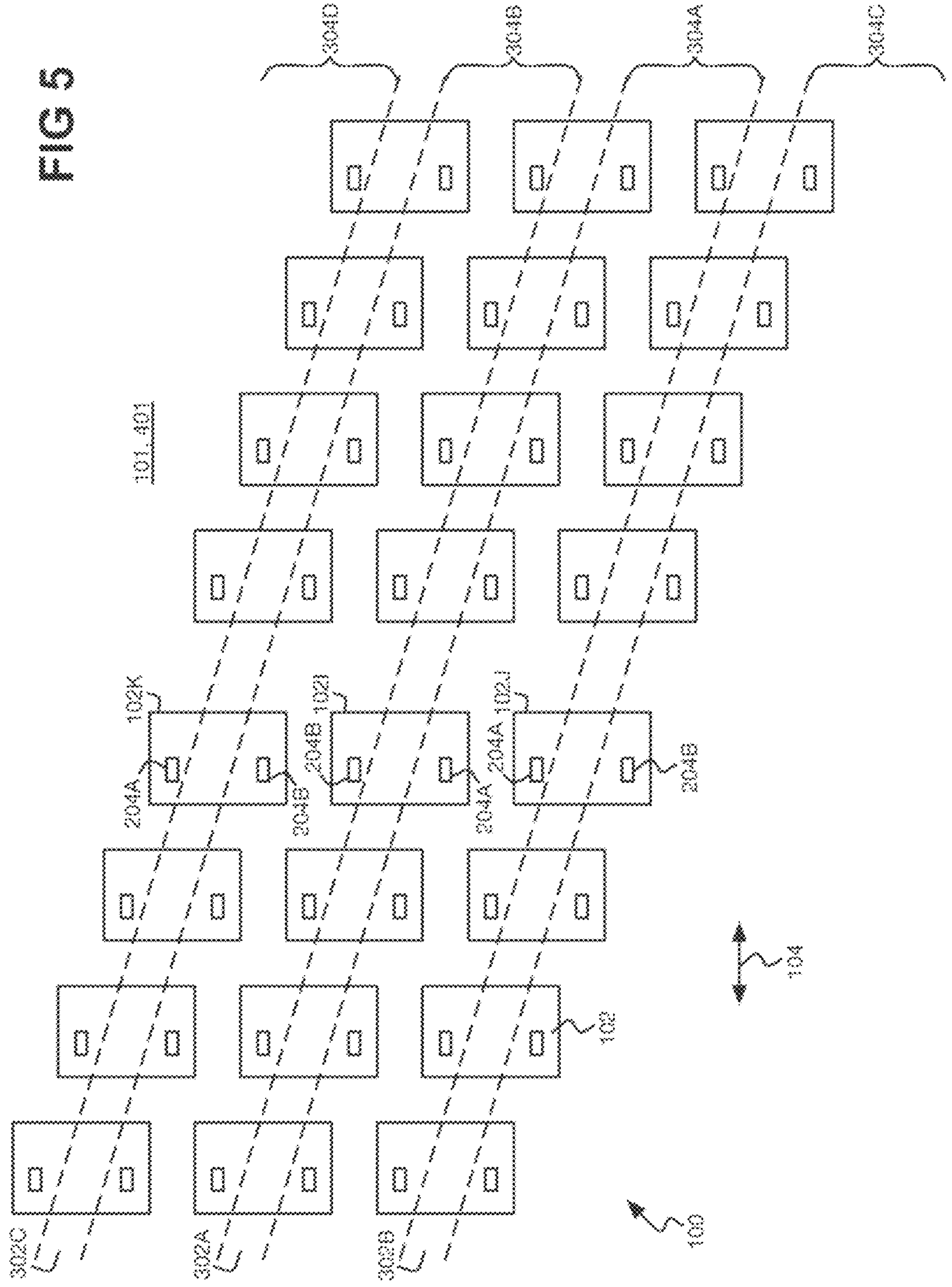
FIG. 5 is a top-view diagram of an example fluid-ejection element layer and an example fluid inlet and outlet channel layer of the fluid-ejection printhead of FIG. 2.

FIG. 5 shows a top view of an example fluid-ejection element layer 101 and an example fluid inlet and outlet channel layer 401 of the fluid-ejection printhead 100. In the example, three (i.e., first, second, and third) rows 302A, 302B, and 302C of the fluid-ejection elements 102 are specifically depicted within the fluid-ejection element layer 101, which is over the fluid inlet and outlet channel layer 401. Fluid-ejection elements 102I, 102J, and 102K of the rows 302A, 302B, and 302C, respectively, are specifically called out in FIG. 5.

The rows 302A, 302B, and 302C are at a non-parallel and non-perpendicular angle to the scan axis 104. The dot rows 106 are not shown, nor are the distances 108 and 110 identified, in FIG. 5 for illustrative clarity. In the example, each fluid-ejection element 102 of the sparse array is specifically that of FIG. 4A, with the feedholes 204A and 204B (but not the actuators 202A and 202B) specifically depicted.

The underlying fluid inlet and outlet channel layer 401 includes channels 304A, 304B, 304C, and 304D. The channels 304A and 304D are specifically (first and second) fluid inlet channels in the example, and the channels 304B and 304C are specifically (first and second) fluid outlet channels. The channels 304A, 304B, 304C, and 304D are also at a non-perpendicular and non-parallel angle relative to the scan axis 104.

The fluid inlet channel 304A is shared by the fluid inlet feedhole 204A of each fluid-ejection element 102 in rows 302A and 302B. The fluid outlet channel 304B is shared by the fluid outlet feedhole 204B of each fluid-ejection element 102 in rows 302A and 302C. The fluid outlet channel 304C is shared by the fluid outlet feedhole 204B of each element 102 in row 302B (and in a row immediately below row 302B, if the row 302B is not the last row). The fluid inlet channel 304D is shared by the fluid inlet feedhole 204A of each element 102 in row 302C (and in a row immediately above row 302C, if the row 302C is not the first row).

Figure 6:
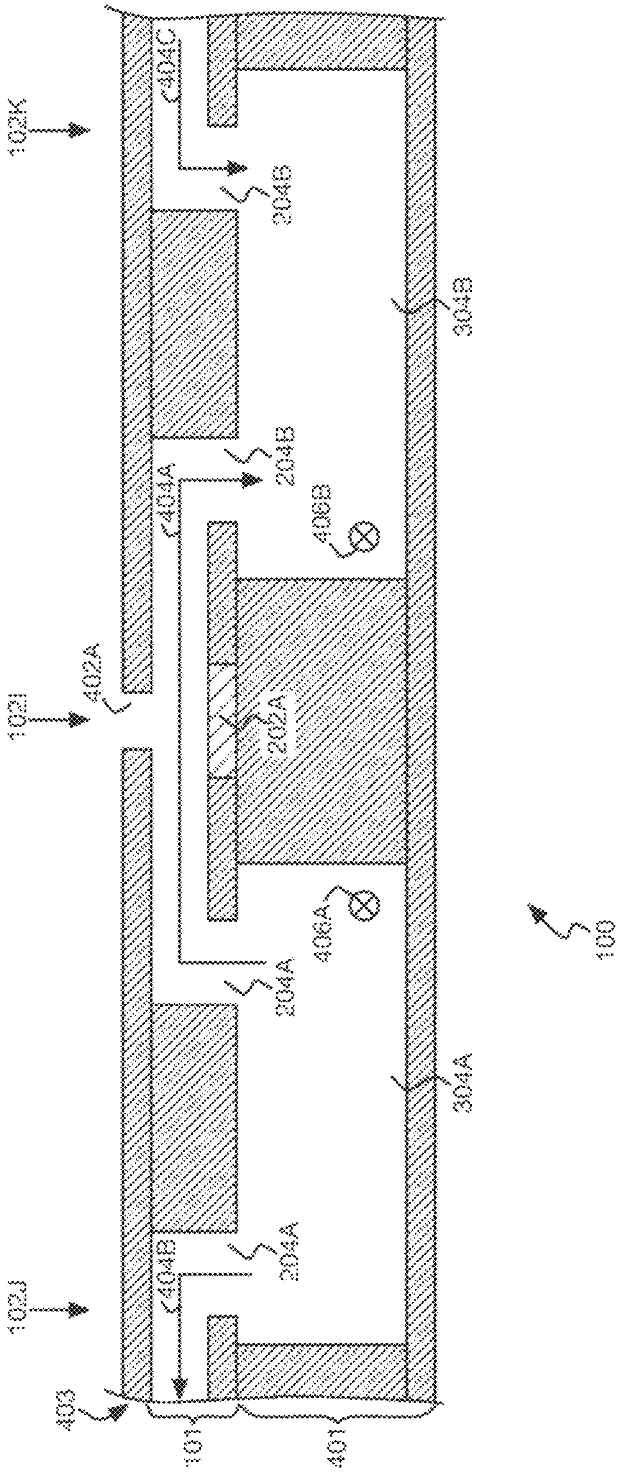
FIG. 6 is a cross-sectional diagram of the example fluid-ejection element and fluid inlet and outlet channel layers of FIG. 5.

FIG. 6 shows a cross-section of the fluid-ejection element layer 101 and the fluid inlet and outlet channel layer 401 of FIG. 5. The cross-section is perpendicular to the scan axis 104, across the feedholes 204A and 204B of the fluid-ejection elements 102I, 102J, and 102K. The channels 304A and 304B are specifically depicted in FIG. 6, where the channels 304C and 304D are not shown for illustrative clarity. Also shown in FIG. 6 is a fluid-ejection nozzle layer 403 above the fluid-ejection element layer 101, and which includes a fluid-ejection nozzle 402A for the actuator 202A (and a nozzle 402B for the actuator 202B in the case of FIG. 4A) of each element 102. In the figure, the nozzle 402A for the actuator 202A of the element 102I is thus specifically shown.

Fluid flow within the fluid-ejection element 102I is depicted by the arrow 404A. Fluid flows from the fluid inlet channel 304A upwards into the element 102I at the fluid inlet feedhole 204A of the element 102I. Within the element 102I, the fluid then flows past the fluid-ejection actuator 202A (and the actuator 202B in the case of FIG. 4A), before exiting the element 102I at the fluid outlet feedhole 204B of the element 102I downwards into the fluid outlet channel 304B. When fluid is to be ejected from the element 102I through the nozzle 402A, the actuator 202A is fired. The nozzle 402A may form a part of the element 102I.

Partial fluid flow within the fluid-ejection elements 102J and 102K is respectively depicted by the arrows 404B and 404C. Fluid flows from the fluid inlet channel 304A upwards into the element 102J at the fluid inlet feedhole 204A of the element 102J. Fluid flows outwards from the element 102K at the fluid outlet feedhole 204B of the element 102K into the fluid outlet channel 304B.

In the example, fluid flow within the fluid inlet channel 304A is into the plane of the figure, per the arrow tail 406A. Similarly, fluid flow within the fluid outlet channel 304B is into the plane of the figure, per the arrow tail 406B. The fluid is positively pressurized within the fluid inlet channel 304A and/or is negatively pressurized within the fluid outlet channel 304B to provide for constant fluid recirculation through the fluid-ejection elements 102I, 102J, 102K even when the elements 102I, 102J, and 102K are not ejecting fluid.

Figure 7A:
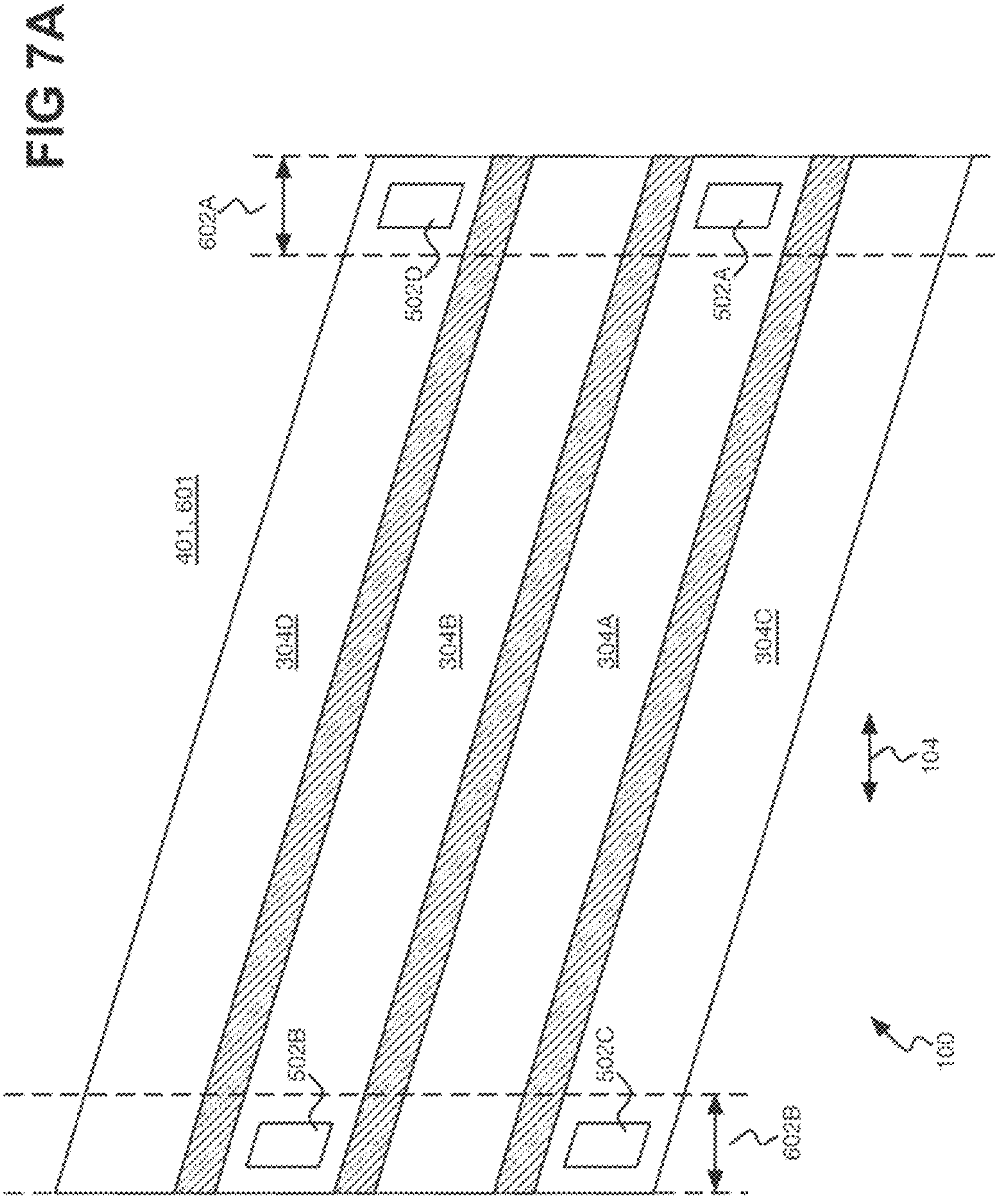
FIGS. 7A and 7B are top-view diagrams of an example fluid inlet and outlet channel layer and an example fluid inlet and outlet slot layer of the fluid-ejection printhead of FIG. 2.
Figure 7B:
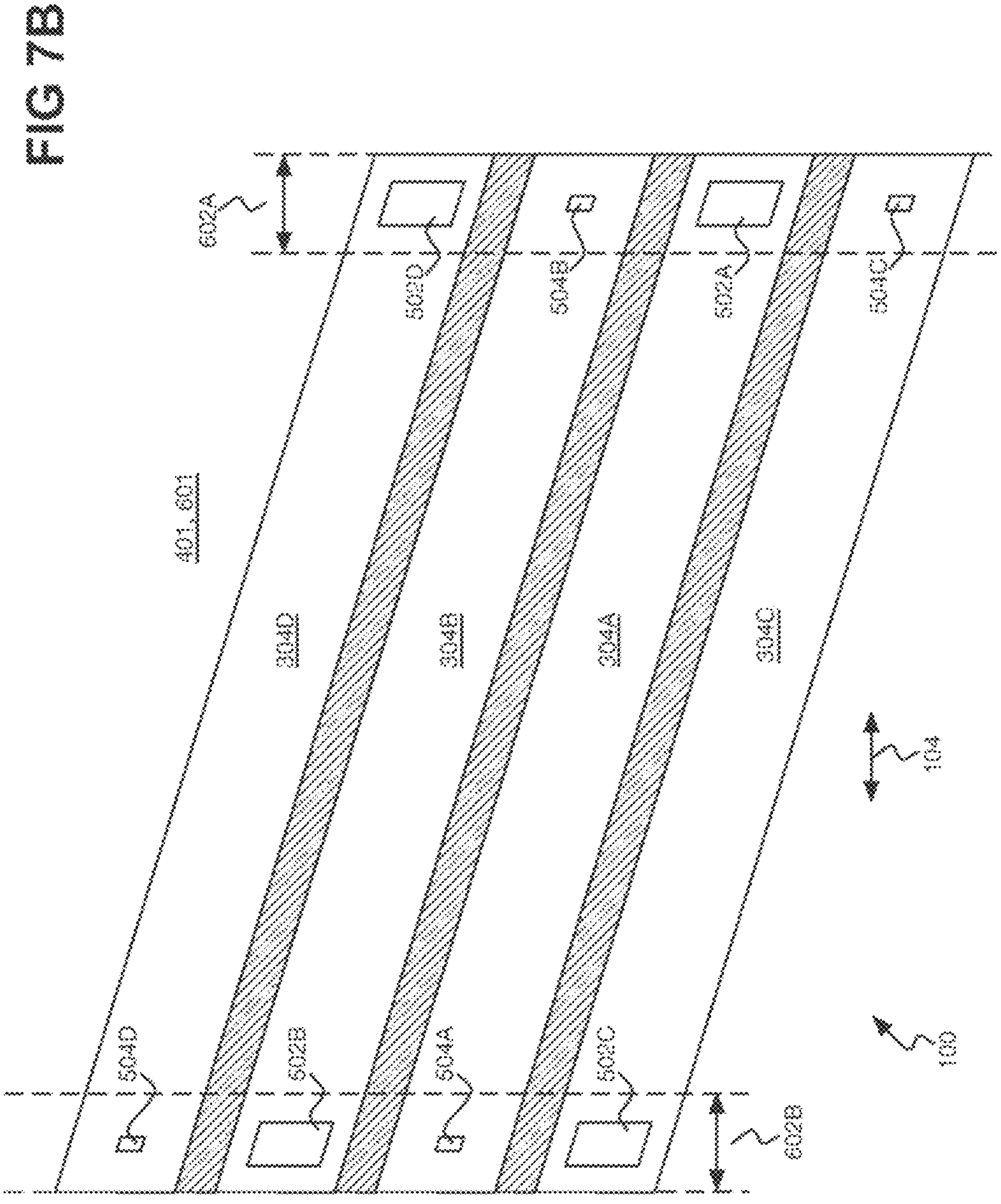

FIGS. 7A and 7B show top views of an example fluid inlet and outlet channel layer 401 and an underlying example fluid inlet and outlet slot layer 601 of the fluid-ejection printhead 100. The channels 304A, 304B, and 304D are fully depicted in FIGS. 7A and 7B. The channel 304C, by comparison, is partially depicted in FIGS. 7A and 7B.

In both FIGS. 7A and 7B, the underlying fluid inlet and outlet slot layer 601 includes a fluid inlet slot 602A and a fluid outlet slot 602B that are perpendicular to the scan axis 104. The fluid inlet slot 602A is shared by the fluid inlet channels 304A and 304D, and the fluid outlet slot 602B is shared by the fluid outlet channels 304B and 304C. Specifically, the fluid inlet channels 304A and 304D have respective fluid inlet feedholes 502A and 502D fluidically connected to the fluid inlet slot 602A. The fluid outlet channels 304B and 304C likewise have respective fluid outlet feedholes 502B and 502C fluidically connected to the fluid outlet slot 602B.

In FIG. 7B, the fluid inlet channels 304A and 304D also have respective fluid bypass feedholes 504A and 504D fluidically connected to the fluid outlet slot 602B. The fluid outlet channels 304B and 304C likewise have respective fluid bypass feedholes 504B and 504C fluidically connected to the fluid inlet slot 602A. The bypass feedholes 504A, 504B, 504C, and 504D may be the same size as the feedholes 204A and 204B, and/or about one-tenth the size of the feedholes 502A, 502B, 502C, and 502D. However, the feedholes 504A, 504B, 504C, and 504D are depicted larger in FIG. 7B for illustrative clarity.

Figure 8A:
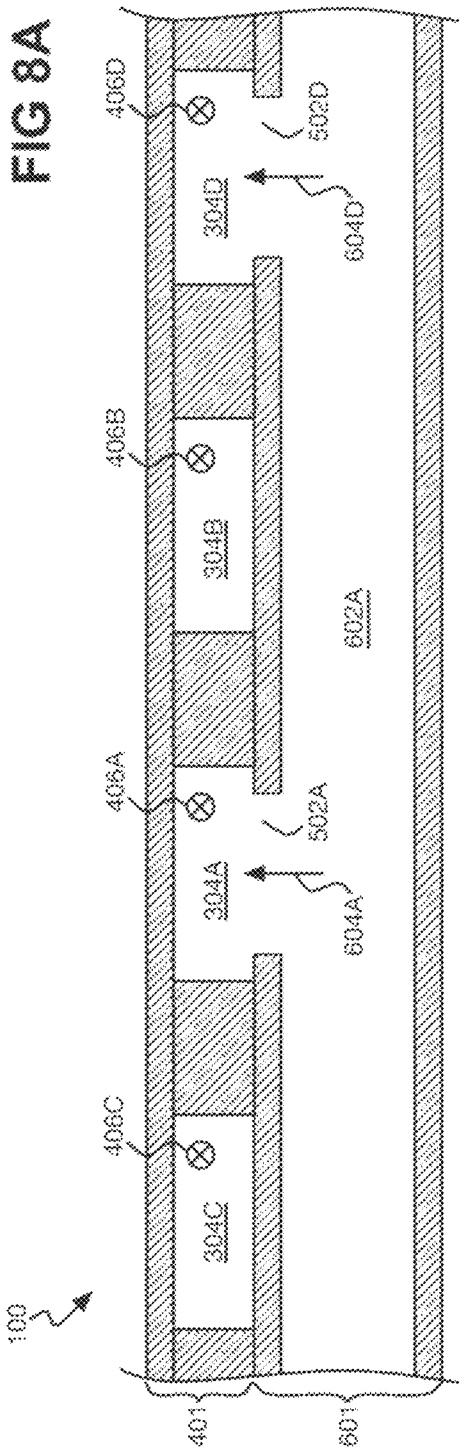
FIGS. 8A, 8B, 8C and 8D are cross-sectional diagrams of the example fluid inlet and outlet channel and fluid inlet and outlet slot layers of FIGS. 7A and 7B.
Figure 8B:
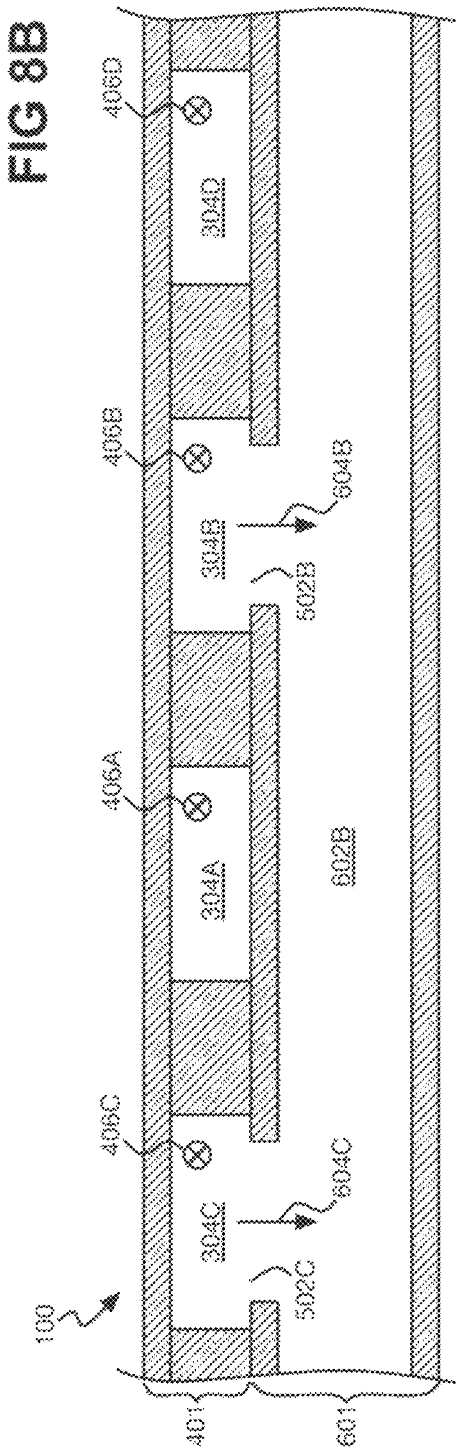
Figures 8C, 8D:
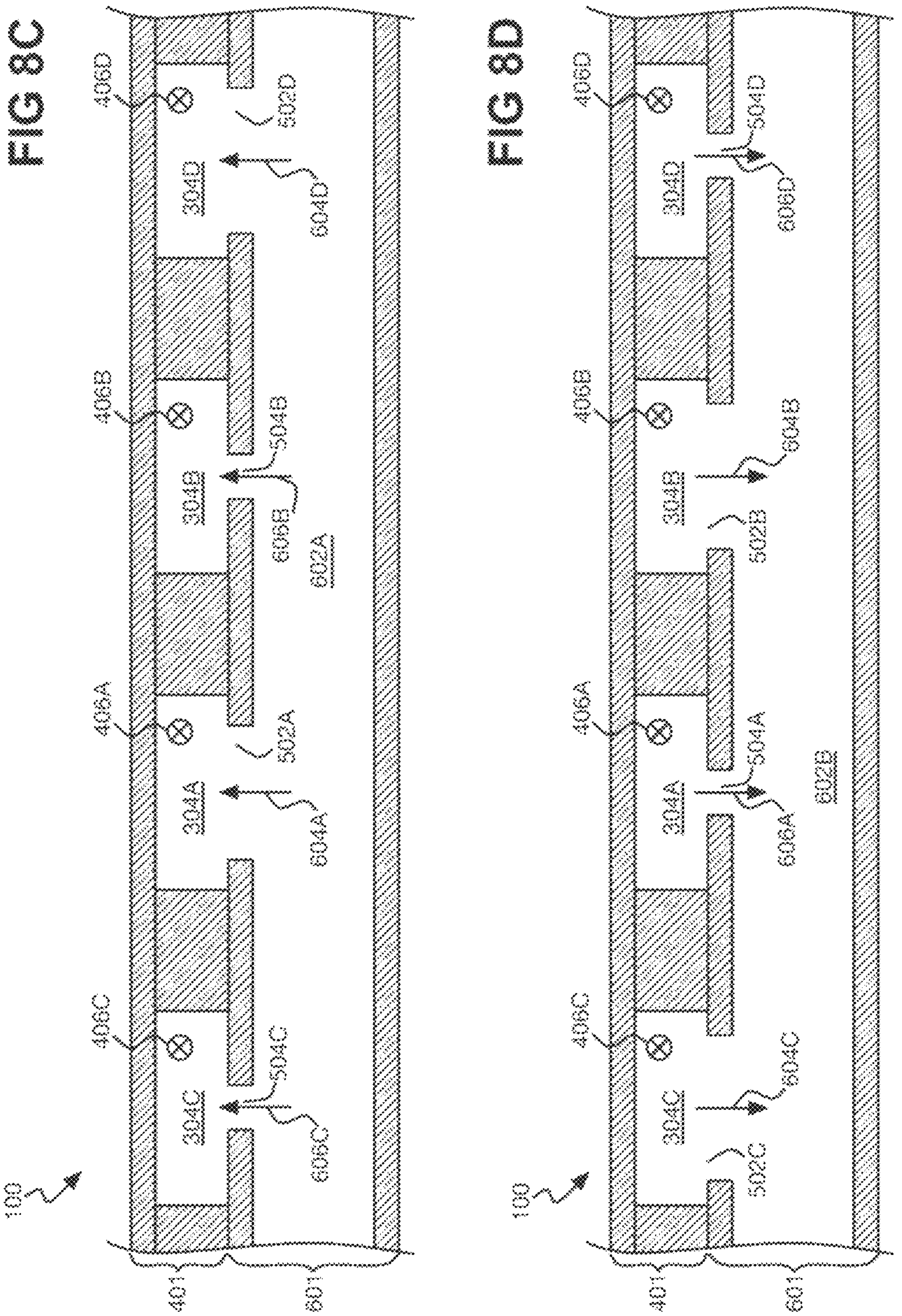

FIGS. 8A and 8B show cross-sections of the fluid inlet and outlet channel layer 401 and the fluid inlet and outlet slot layer 601 of FIG. 7A, whereas FIGS. 8C and 8D show cross-sections of the layer 401 and the layer 601 of FIG. 7B. The cross-sections of FIGS. 8A and 8C are perpendicular to the scan axis 104, along the fluid inlet slot 602A, and bisect the fluid inlet feedholes 502A and 502D (and the fluid bypass feedholes 504B and 504C in FIG. 8C). The cross-sections of FIGS. 8B and 8D are also perpendicular to the scan axis 104, but along the fluid outlet slot 602B, and bisect the fluid outlet feedholes 502B and 502C (and the fluid bypass feedholes 504A and 504D in FIG. 8D).

In FIGS. 8A and 8C, fluid flows upward from the fluid inlet slot 602A to the fluid inlet channels 304A and 304D at their respective fluid inlet feedholes 502A and 502D, per arrows 604A and 604D. In FIG. 8C, fluid also flows upward from the inlet slot 602A to the fluid outlet channels 304B and 304C at their respective fluid bypass feedholes 504B and 504C, per arrows 606B and 606C. In FIGS. 8B and 8D, fluid flows downwards into the fluid outlet slot 602B from the fluid outlet channels 304B and 304C at their respective fluid outlet feedholes 502B and 502C, per arrows 604B and 604C. In FIG. 8D, fluid also flows downwards into the outlet slot 602B from the inlet channels 304A and 304D at their respective fluid bypass feedholes 504A and 504D, per arrows 606A and 606D. In the example, fluid flows within the channels 304A, 304B, 304C, and 304D into the plane of the figure, per arrow tails 406A, 406B, 406C, and 406D.

Fluid may flow within each of the slots 602A and 602B from left to right or from right to left. The directions of fluid flow within the slots 602A and 602B may be the same, or the directions may be opposite one another. The fluid can be positively pressurized within the fluid inlet slot 602A to recirculate fluid into the fluid inlet channels 304A and 304D. Additionally or instead, the fluid can be negatively pressurized within the fluid outlet slot 602B to recirculate fluid from the fluid outlet channels 304B and 304C.

Figure 9:
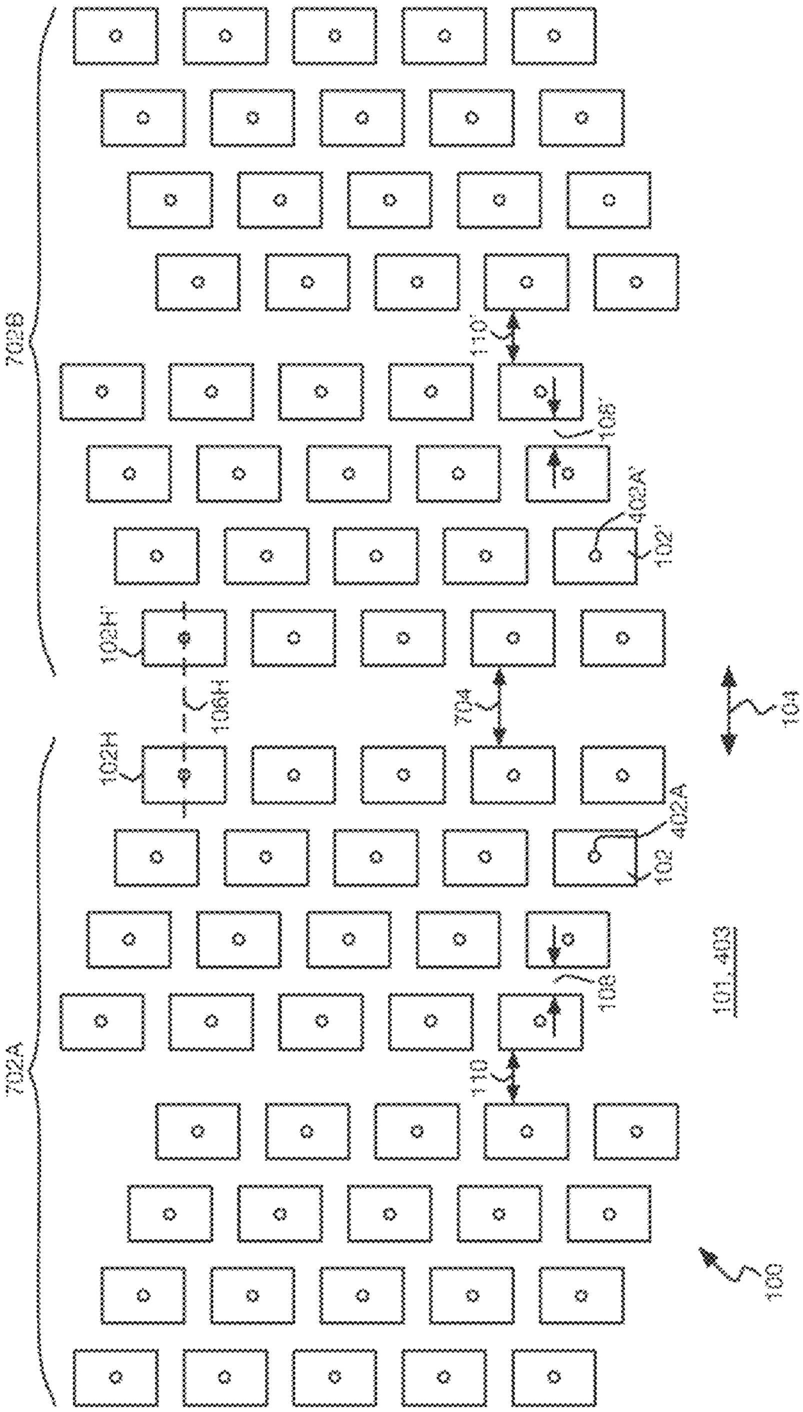
FIG. 9 is a top-view diagram of another example fluid-ejection element layer and another example fluid-ejection nozzle layer of the fluid-ejection printhead of FIG. 2.

FIG. 9 shows a top view of another example fluid-ejection element layer 101 and another example fluid-ejection nozzle layer 403 of the fluid-ejection printhead 100. The fluid-ejection element layer 101 is again under the fluid-ejection nozzle layer 403, as in FIG. 3, but includes fluid-ejection elements 102 and 102'. In the example, the fluid-ejection nozzle layer 403 includes one fluid-ejection nozzle 402A/402A' for each fluid-ejection element 102/102', such that the elements 102 and 102' are each implemented as in FIG. 4B. However, in other implementations there may be more than one fluid-ejection nozzle for each fluid-ejection element 102/102', respectively, such as two nozzles as in the case in which the elements 102 and 102' are each implemented as in FIG. 4A.

The fluid-ejection nozzles 402A and 402A' for the fluid-ejection elements 102 and 102' are organized in a sparse array. The nozzles 402A and the elements 102 are on the left side 702A, and are organized as in FIG. 3. The nozzles 402A' and the elements 102' are on the right side 702B, and are organized in a symmetrically mirrored manner to the nozzles 402 and the elements 102. Each nozzle 402A and each element 102 on the left side 702A thus has a corresponding nozzle 402A' and element 102' on the right side 702B. For example, the fluid-ejection element 102H has a corresponding fluid-ejection element 102H', and the fluid-ejection nozzle 402A that is for the element 102H has a corresponding fluid-ejection nozzle 402B that is for the element 102H'.

But for the dot row 106H, the dot rows 106 are not specifically called out in FIG. 9 for illustrative clarity. In the example, each dot row 106 symmetrically bisects one fluid-ejection element 102 and one fluid-ejection element 102', and thus intersects one fluid-ejection nozzle 402A and one fluid-ejection nozzle 402A'. The fluid-ejection elements 102 and 102' that are symmetrically bisected by a dot row 106 are the elements 102 and 102' that eject fluid onto that dot row 106. Similarly, fluid is ejected onto a dot row 106 from and through the fluid-ejection nozzles 402A and 402A' that intersect the dot row 106. For example, as to the dot row 106H specifically identified in FIG. 9, the element 102H ejects fluid through its nozzle 402A onto the dot row 106H (as is the case in FIG. 3), as does the element 102H' through its nozzle 402A' (as is not the case in FIG. 3).

Adjacent fluid-ejection elements 102 along the scan axis 104 on the left side 702A are separated by a distance 108, except for the middle two elements 102 on the left side 702A, which are separated by a distance 110. Similarly, adjacent elements 102' along the scan axis 104 on the right side 702B are separated by a distance 108', except for the middle two elements 102' on the right side 702B, which are separated by a distance 110'. The distances 108 and 108' may be equal to one another, as may the distances 110 and 110'.

Adjacent fluid-ejection elements 102 and 102' between the left and right sides 702A and 702B, such as the adjacent elements 102H and 102H', are separated by a distance 704. The distances 110 and 110' are greater than the distances 108 and 108' to provide space for temperature sensors and other circuitry, as in FIG. 3 as to the distances 110 and 108. The distance 704 may also be greater than the distances 110 and 110' to provide for firing circuitry and other circuitry.

In the example of FIG. 9, the sparse array of the fluid-ejection nozzles 402A and 402A' results in more than one nozzle 402A/402A' corresponding to each dot row 106, even though each fluid-ejection element 102 and 102' respectively include just one nozzle 402A and 402A'. This is because there is both a nozzle 402A and a nozzle 402A' (and an element 102 and an element 102') that correspond to each dot row 106. FIG. 9 thus differs from that of FIG. 3, in which the sparse array of the fluid-ejection nozzles 402A and 402B results in more than one nozzle 402A and 402B corresponding to each dot row 106 since each fluid-ejection element 102 for each dot row 106 includes two nozzles 402A and 402B.

As noted above, though, the fluid-ejection elements 102 and 102' in the example of FIG. 9 can instead each be implemented as in FIG. 4A—similar to the example of FIG. 3—instead of as in FIG. 4B. In this case, there would still be both an element 102 and an element 102' corresponding to each dot row 106. However, each element 102 and 102' would have two fluid-ejection nozzles 402A and 402B. In such an implementation, there would thus be four nozzles 402A and 402B for each dot row 106—a pair of nozzles 402A and 402B for each of the elements 102 and 102' for the dot row 106 in question.

Figure 10:
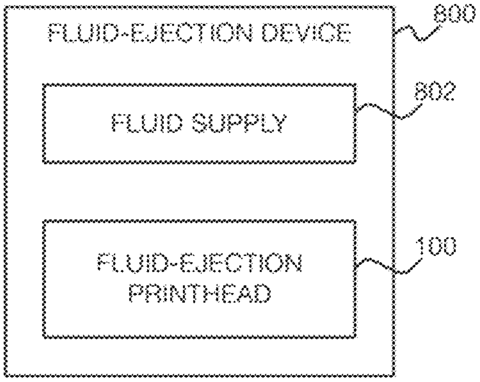
FIG. 10 is a block diagram of an example fluid-ejection device.

FIG. 10 shows a block diagram of an example fluid-ejection device 800. For instance, the fluid-ejection device may be a printing device that ejects ink. The fluid-ejection device 800 includes a fluid supply 802 and a fluid-ejection printhead 100, which are fluidically coupled to one another. The fluid supply 802 may be integrated with the printhead 100 within a corresponding fluid-ejection cartridge that may include one or multiple other printheads, or may be externally separate from the printhead 100, and potentially from the housing of the device 800 itself.

Fluid-ejection printheads having sparse arrays of fluid-ejection elements have been described herein. For each dot row, there can be more than one fluid-ejection actuator, on the same fluid-ejection element (as in FIGS. 3 and 4A) and/or on different fluid-ejection elements (as in FIGS. 9 and 4B). In this way, the described printheads can result in improved image quality resulting from fluid ejection.

What is claimed is:

1. A fluid-ejection printhead comprising:

a sparse array of fluid-ejection nozzles, the fluid-ejection nozzles through which fluid is ejectable onto dot rows parallel to a scan axis of the fluid-ejection printhead, where the fluid is ejectable by more than one fluid-ejection nozzle onto each dot row; and a plurality of fluid-ejection elements that each correspond to a pair of the fluid-ejection nozzles through which the fluid is ejectable onto a same dot row and that each include a corresponding pair of fluid-ejection actuators.

2. The fluid-ejection printhead of claim 1, wherein the sparse array of fluid-ejection nozzles is sparse in that the fluid-ejection nozzles through which the fluid is ejectable onto adjacent of the dot rows are spaced apart along a direction parallel to the scan axis.

3. The fluid-ejection printhead of claim 1, wherein each fluid-ejection element includes a fluid inlet feedhole shared by each fluid-ejection actuator and a fluid outlet feedhole shared by each fluid-ejection actuator, wherein, for each fluid-ejection element, a first distance between a first fluid-ejection actuator of the corresponding pair and each of the fluid inlet and fluid outlet feedholes is identical, and wherein a second distance between a second fluid-ejection actuator of the corresponding pair and each of the fluid inlet and fluid outlet feedholes is identical.

4. The fluid-ejection printhead of claim 1, wherein, for each fluid-ejection element, the fluid-ejection actuators of the corresponding pair output fluid at different drop weights.

5. The fluid-ejection printhead of claim 1, wherein each fluid-ejection element includes a fluid inlet feedhole shared by each fluid-ejection actuator and a fluid outlet feedhole shared by each fluid-ejection actuator, wherein the sparse array comprises first and second rows of the fluid-ejection elements, and the fluid-ejection printhead further comprises:

a fluid inlet channel shared by the fluid inlet feedhole of each fluid-ejection element of the first and second rows.

6. The fluid-ejection printhead of claim 5, wherein the sparse array comprises a third row of the fluid-ejection elements, and the fluid-ejection printhead further comprises:

a fluid outlet channel shared by the fluid outlet feedhole of each fluid-ejection element of the first and third rows.

7. The fluid-ejection printhead of claim 6, wherein the fluid inlet channel is a first fluid inlet channel, the fluid outlet channel is a first fluid outlet channel, and the fluid-ejection printhead further comprises:

a second fluid inlet channel shared by the fluid inlet feedhole of each fluid-ejection element of the third row;

a second fluid outlet channel shared by the fluid outlet feedhole of each fluid-ejection element of the second row;

a fluid inlet slot shared by the first and second fluid inlet channels; and a fluid outlet slot shared by the first and second fluid outlet channels.

8. A fluid-ejection printhead comprising:

a sparse array of fluid-ejection nozzles, the fluid-ejection nozzles through which fluid is ejectable onto dot rows parallel to a scan axis of the fluid-ejection printhead, where the fluid is ejectable by more than one fluid-ejection nozzle onto each dot row; and a plurality of fluid-ejection elements that each correspond to one of the fluid-ejection nozzles and that each include one fluid-ejection actuator.

9. The fluid-ejection printhead of claim 8, wherein the sparse array of fluid-ejection nozzles is sparse in that the fluid-ejection nozzles through which the fluid is ejectable onto adjacent of the dot rows are spaced apart along a direction parallel to the scan axis.

10. The fluid-ejection printhead of claim 8, wherein each fluid-ejection element includes a fluid inlet feedhole and a fluid outlet feedhole shared by each fluid-ejection actuator, wherein the sparse array comprises first, second, and third rows of the fluid-ejection elements, and the fluid-ejection printhead further comprises:

a fluid inlet channel shared by the fluid inlet feedhole of each fluid-ejection element of the first and second rows; and a fluid outlet channel shared by the fluid outlet feedhole of each fluid-ejection element of the first and third rows.

11. The fluid-ejection printhead of claim 10, wherein the fluid inlet channel is a first fluid inlet channel, the fluid outlet channel is a first fluid outlet channel, and the fluid-ejection printhead further comprises:

a second fluid inlet channel shared by the fluid inlet feedhole of each fluid-ejection element of the third row;

a second fluid outlet channel shared by the fluid outlet feedhole of each fluid-ejection element of the second row;

a fluid inlet slot shared by the first and second fluid inlet channels; and a fluid outlet slot shared by the first and second fluid outlet channels.

12. A fluid-ejection device comprising:

a fluid supply; and a fluid-ejection printhead fluidically coupled to the fluid supply and comprising a sparse array of fluid-ejection nozzles through which fluid is ejectable onto dot rows parallel to a scan axis of the fluid-ejection printhead, wherein the fluid is ejectable by more than one fluid-ejection nozzle onto each dot row, wherein the fluid-ejection printhead further comprises a plurality of fluid-ejection elements that each correspond to a pair of the fluid-ejection nozzles through which the fluid is ejectable onto a same dot row and that each include a corresponding pair of fluid-ejection actuators.

13. The fluid-ejection device of claim 12, wherein the sparse array of fluid-ejection nozzles is sparse in that the fluid-ejection nozzles through which the fluid is ejectable onto adjacent dot rows are spaced apart along a direction parallel to the scan axis.

14. The fluid-ejection device of claim 12, wherein the fluid-ejection printhead further comprises a plurality of fluid-ejection elements that each correspond to one of the fluid-ejection nozzles and that each include one fluid-ejection actuator.

* * * * *